US011399371B2

(12) United States Patent
Gong (10) Patent No.: US 11,399,371 B2
(45) Date of Patent: Jul. 26, 2022

(54) CHANNEL ALLOCATION METHOD FOR VEHICLE AD HOC NETWORK (71) Applicant: BOE TECHNOLOGY GROUP CO., LTD., Beijing (CN)

(72) Inventor: Weibing Gong, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 508 days.

(21) Appl. No.: 16/472,270

(22) PCT Filed: Oct. 15, 2018

(86) PCT No.: PCT/CN2018/110231
§ 371 (c)(1),
(2) Date: Jun. 21, 2019

(87) PCT Pub. No.: WO2019/148887
PCT Pub. Date: Aug. 8, 2019

(65) Prior Publication Data
US 2021/0360626 A1 Nov. 18, 2021

(30) Foreign Application Priority Data

Jan. 30, 2018 (CN) .......................... 201810089176.7

(51) Int. Cl.
H04W 72/04 (2009.01)
H04W 4/40 (2018.01)
H04W 84/18 (2009.01)

(52) U.S. Cl.
CPC ......... H04W 72/0453 (2013.01); H04W 4/40 (2018.02); H04W 72/0413 (2013.01); H04W 84/18 (2013.01)

(58) Field of Classification Search
CPC ............... H04W 4/40; H04W 72/0413; H04W 72/0453; H04W 4/80; H04W 72/04; H04W 84/18; H04W 88/04
See application file for complete search history.

(56) References Cited

U.S. PATENT DOCUMENTS

2011/0128902 A1* 6/2011 Guo ........................ G08G 1/161
370/312
2019/0180613 A1* 6/2019 Anschutz .............. H04W 8/005
(Continued)

FOREIGN PATENT DOCUMENTS

CN 103167024 A 6/2013
CN 103269363 A 8/2013
(Continued)

OTHER PUBLICATIONS

Search Report and Written Opinion for Chinese Patent Application No. PCT/CN2018/110231 dated Jan. 4, 2019.
(Continued)

Primary Examiner — Brian D Nguyen
(74) Attorney, Agent, or Firm — Calfee, Halter & Griswold LLP (57) ABSTRACT A channel allocation method for a vehicle ad hoc network comprising a plurality of service channels and at least one control channel. The method comprises: monitoring a service channel allocation request of a message to be transmitted in real time through the at least one control channel, while continuing message transmission through the plurality of service channels; and allocating a service channel to the message to be transmitted through the at least one control channel in response to the service channel allocation request.

13 Claims, 4 Drawing Sheets (56) References Cited

U.S. PATENT DOCUMENTS

| | | | | |
|---|---|---|---|---|
| 2020/0092796 A1* | 3/2020 | Baek | .................... | H04W 8/005 |
| 2020/0396639 A1* | 12/2020 | Hofmann | ................ | H04L 67/12 |
| 2021/0153099 A1* | 5/2021 | Back | ..................... | H04L 41/12 |
| 2021/0166572 A1* | 6/2021 | Kim | ........................ | G06T 17/20 |
| 2021/0185504 A1* | 6/2021 | Wong | ..................... | H04W 4/06 |
| 2021/0239853 A1* | 8/2021 | Al-Stouhi | ............... | G01S 19/46 |
| 2021/0328991 A1* | 10/2021 | Dean | ..................... | G16H 10/65 |

FOREIGN PATENT DOCUMENTS

| | | |
|---|---|---|
| CN | 103517445 A | 1/2014 |
| CN | 104507051 A | 4/2015 |
| CN | 104754746 A | 7/2015 |
| CN | 106793049 A | 5/2017 |
| CN | 108337660 A | 7/2018 |
| TW | 201204108 A | 1/2012 |

OTHER PUBLICATIONS

First Office Action for Chinese Patent Application No. 201810089176.7 dated Sep. 27, 2019.

\* cited by examiner

Fig.1 monitoring a service channel allocation request of a message to be transmitted in real time through the control channel, while continuing message transmission through the plurality of service channels — S210 allocating a service channel to the message to be transmitted through the control channel in response to the service channel allocation request — S220

Fig.6 receiving, by the first roadside unit, a service channel occupation list of the non-security message in the second roadside unit from the second roadside unit periodically through the control channel  ⟵ S730 detecting, by the first roadside unit, idle states and queue lengths of the service channels through the control channel  ⟵ S740 allocating, by the first roadside unit, an idle channel to the non-security message in the non-security message occupation list in a case where the first roadside unit has the idle service channel, otherwise allocating a service channel with a minimum queue length of the non-security message to the non-security message  ⟵ S750

```
                                                    ┌─ S921
determining an allocation priority of service channel based on an  /
           ant colony algorithm
                         │
                         ▼
                                                    ┌─ S922
determining service channel allocation of the message to be transmitted  /
           based on the allocation priority
```

CHANNEL ALLOCATION METHOD FOR VEHICLE AD HOC NETWORK

RELATED APPLICATION

This application is the U.S. national phase entry of PCT Application No. PCT/CN2018/110231, filed Oct. 15, 2018, which is based upon and claims priority to Chinese Patent Application No. 201810089176.7, filed on Jan. 30, 2018, the entire contents of which are incorporated herein by reference.

TECHNICAL FIELD

The present disclosure relates to the field of communication and vehicle technology, in particular to a channel allocation method for a vehicle ad hoc network.

BACKGROUND

Figure 1:
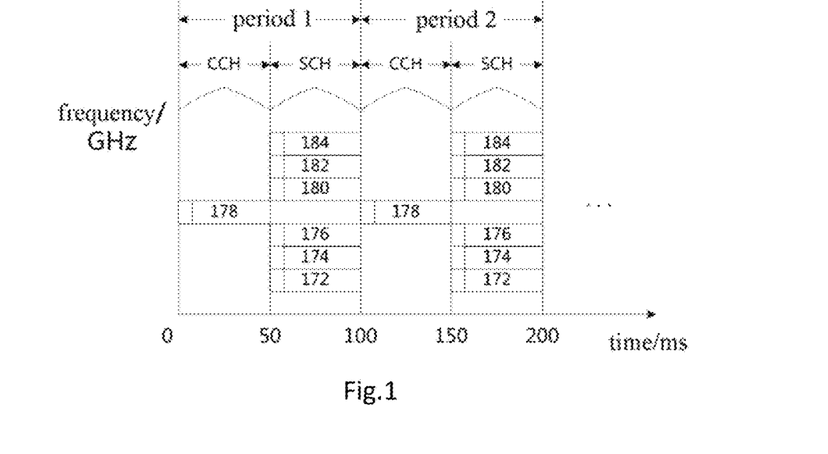
FIG. 1 schematically shows a diagram of utilization periods of service channels and a control channel for a vehicle ad hoc network in the related art.

A vehicle ad hoc network (VANET) is a wireless ad hoc local area network based on the 802.11p/WAVE protocol stack. As shown in FIG. 1, the WAVE protocol can divide a frequency band into seven channels, which are sequentially numbered 172, 174, 176, 178, 180, 182, and 184, where the channel 178 is a control channel (CCH) and the others are service channels (SCH). The control channel is mainly configured for managing and controlling service channels instead of data transmission, and the service channels are completely configured for data transmission.

As shown in FIG. 1, when a VANET protocol stack utilizes a frequency band channel, it takes 100 ms as a period, and each period is divided into two parts: a control process and a data transmission process, each occupying 50 ms. Each of the two processes has a boot interval before start, and each node in the vehicle ad hoc network need start to work after the boot interval is over. The main function of the boot interval is to synchronize the time of all nodes in the vehicle ad hoc network so that it can coordinately implement collision-free channel switching. During the boot interval, both the control channel and the service channel do not work. The VANET comprises roadside units (RSU) and onboard units (OBU), and the onboard units constitute an ad hoc network and can access the Internet via the roadside units. Communication between the onboard units and between the onboard units and the roadside units is implemented through the above-mentioned WAVE protocol stack channel utilization period.

In the channel utilization process of the vehicle ad hoc network based on related art, the time for data transmission for each channel is less than 50 ms in a period of 100 ms, in other words, the utilization rate of each channel is less than 50%. Further, in the process of message transmission of the vehicle ad hoc network in related art, when an onboard unit moves from the communication area of one roadside unit to the communication area of another roadside unit, a message transmission interruption occurs due to discontinuous transmission of the service channel and switch of the roadside units which communicate with the onboard unit.

SUMMARY

The present disclosure is intended to address at least one of the above technical drawbacks, particularly the problem of low channel utilization rate in related art, and to achieve seamless retransmission of the onboard unit during transition between roadside units.

According to an exemplary embodiment, there is presented a channel allocation method for a vehicle ad hoc network comprising a plurality of service channels and at least one control channel. The method comprises:

monitoring a service channel allocation request of a message to be transmitted in real time through the at least one control channel, while continuing message transmission through the plurality of service channels; and allocating a service channel to the message to be transmitted through the at least one control channel in response to the service channel allocation request.

In certain exemplary embodiments of the channel allocation method for the vehicle ad hoc network, the service channel allocation request comprises a type of the message to be transmitted, and the allocating a service channel to the message to be transmitted through the at least one control channel in response to the service channel allocation request comprises: allocating a service channel to the message to be transmitted through the at least one control channel based on the type of the message to be transmitted.

In the channel allocation method for the vehicle ad hoc network according to an exemplary embodiment, the type of the message to be transmitted comprises a security message and a non-security message.

In certain exemplary embodiments of the channel allocation method for the vehicle ad hoc network according to the present disclosure, the vehicle ad hoc network is connected to a public security information server via the Internet, and the security message comprises a public security message from the public security information server.

In certain exemplary embodiments of the channel allocation method for the vehicle ad hoc network, the allocating a service channel to the message to be transmitted through the at least one control channel based on the type of the message to be transmitted comprises:

stopping transmission of non-security messages on all service channels through the at least one control channel when the type of the message to be transmitted is a security message;

detecting queue lengths of security messages on all service channels through the at least one control channel; and allocating a service channel with a minimum queue length of security messages to the security message to be transmitted.

In certain exemplary embodiments of the channel allocation method for the vehicle ad hoc network, the allocating the service channel with the minimum queue length of security messages to the message to be transmitted comprises: allocating all idle service channels to the security message requesting the service channel, when it is detected that there are idle service channels.

In certain exemplary embodiments of the channel allocation method for the vehicle ad hoc network, the non-security message comprises an instant message and an Internet service message.

In certain exemplary embodiments of the channel allocation method for the vehicle ad hoc network, the vehicle ad hoc network comprises onboard units and roadside units, and when the message to be transmitted is a non-security message and the service channel allocation request is sent by an onboard unit, the service channel allocation request comprises identity information of the onboard unit that sends the service channel allocation request and a type of the non-security message.

In certain exemplary embodiments of the channel allocation method for the vehicle ad hoc network, when the message to be transmitted is a non-security message and the service channel allocation request is sent by the onboard unit, the service channel allocation request further comprises network protocol information of the onboard unit that sends the service channel allocation request, and the method further comprises: identifying the identity information of the onboard unit and verifying whether the network protocol information is compatible through the at least one control channel, prior to the allocating a service channel to the message to be transmitted through the at least one control channel in response to the service channel allocation request of the message to be transmitted.

In certain exemplary embodiments of the channel allocation method for the vehicle ad hoc network, the roadside units comprise a first roadside unit and a second roadside unit adjacent to the first roadside unit, and the method further comprises:

receiving, by the first roadside unit, a service channel occupation list of the non-security message in the second roadside unit from the second roadside unit periodically through the at least one control channel;

detecting, by the first roadside unit, idle states and queue lengths of the plurality of service channels through the at least one control channel; and allocating, by the first roadside unit, an idle service channel to the non-security message in the non-security message occupation list of the second roadside unit through the at least one control channel, in a case where the first roadside unit has the idle service channel, otherwise allocating a service channel with a minimum queue length of the non-security message in the first roadside unit to the non-security message in the non-security message occupation list of the second roadside unit.

In certain exemplary embodiments of the channel allocation method for the vehicle ad hoc network, the non-security message channel occupation list in the second roadside unit comprises the identity information of the onboard unit occupying the service channel and the type of the non-security message, wherein the identity information of the onboard unit may comprises a MAC address or a IP address of the onboard unit.

In certain exemplary embodiments of the channel allocation method for the vehicle ad hoc network, in a communication area of the first roadside unit, the plurality of service channels comprise n channels, n>=2, and the allocating the service channel to the message to be transmitted in response to the service channel allocation request of the message to be transmitted comprises:

detecting, in each of the n service channels, a queue length of security messages, a queue length of instant messages and a queue length of Internet messages in the first roadside unit communication area, and a queue length of instant messages and a queue length of Internet messages in the service channel occupation list in the second roadside unit communication area;

determining an allocation priority of each of the n service channels by $$\Box\Box\Box\sigma_i = \frac{C_i}{\rho S_i + (1-\rho)(R_i + R'_i + \alpha I_i + \alpha' I'_i) + 1}, \quad i = 1, 2, \ldots, n$$

where $\sigma_i$ represents the allocation priority of the service channel i, $S_i$ represents the queue length of security messages on the service channel i, $R_i$ represents the queue length of instant messages in the communication area of the first roadside unit on the service channel i, $I_i$ represents the queue length of Internet service messages in the communication area of the first roadside unit on the service channel i, $R_i'$ and $I_i'$ represents the queue length of instant messages and Internet service messages in the service channel occupation list in the second roadside unit communication area on the service channel i, respectively, $C_i$ represents the physical bandwidth of the service channel i, $\alpha$ and $\alpha'$ are constants, $0<\alpha<1$, $0<\alpha'<1$, and $\alpha$ and $\alpha'$ represents predetermined influence factors of Internet service messages in the first roadside unit communication area and Internet service messages in the service channel occupation list in the second roadside unit communication area queued on the service channel i on the allocation priority of the service channel i, respectively, $\rho$ is a constant representing whether the message to be transmitted is a security message, wherein when $\rho=1$, it represents a security message, when $\rho=0$, it represents a non-security message; and allocating a service channel to the message to be transmitted based on the allocation priority of the n service channels.

In certain exemplary embodiments of the channel allocation method for the vehicle ad hoc network, the allocating a service channel to the message to be transmitted based on the allocation priority of the n service channels comprises:

calculating an allocation probability of each service channel based on the allocation priority by $$P_i = \frac{\sigma_i^k}{\sum_i (\sigma_i^k)}, \quad i = 1, 2, \ldots, n$$

where $P_i$ represents an allocation probability of the service channel i, and k represents a predetermined adjustment parameter for adjusting the degree of change of the allocation probability; and allocating a service channel to the message to be transmitted based on allocation probabilities of the n service channels.

In certain exemplary embodiments of the channel allocation method for the vehicle ad hoc network, the method further comprises:

when the message to be transmitted is a non-security message, determining, by the first roadside unit, a queue time of the message to be transmitted through the at least one control channel based on queue length of messages on the allocated service channel; and transmitting, by the first roadside unit, the queue time to the onboard unit that sends the allocation channel request through the control channel to implement on-time transmission of the message to be transmitted.

According to another exemplary embodiment, there is presented a communication method for a vehicle ad hoc network. The method comprises:

when an onboard unit is out of a communication range of a first roadside unit and has not entered a communication range of a second roadside unit adjacent to the first roadside unit, connecting the onboard unit indirectly to the first roadside unit or the second roadside unit via a first onboard unit, in the communication range of the first roadside unit, or a second onboard unit, in the communication range of the second roadside unit, adjacent to the onboard unit.

According to yet another exemplary embodiment, there is presented computer readable storage medium or media, storing computer program instructions thereon which, when executed, perform the channel allocation method for the vehicle ad hoc network.

Additional aspects and advantages of the present disclosure will be set forth in part in the description below, which will be obvious from the following description or be appreciated by practicing the disclosure.

BRIEF DESCRIPTION OF THE DRAWINGS

The above and/or additional aspects and advantages of the present disclosure will become apparent and readily understood from the following description with reference to the accompanying drawings wherein.

DETAILED DESCRIPTION OF THE DISCLOSURE

Exemplary embodiments of the present disclosure are described in detail below, and examples of the exemplary embodiments are illustrated in the drawings. The same or similar reference numerals are used to refer to the same or similar elements or elements having the same or similar functions throughout the drawings. The exemplary embodiments described below with reference to the drawings are only used for explanations rather than limitations to the present disclosure.

FIG. 1 shows a diagram of utilization periods of a vehicle ad hoc network in the related art. As shown in FIG. 1, the channel utilization in the related art has a defect that each channel (comprising a control channel CCH and service channels SCHs) is used for transmission in less than 50 ms in 100 milliseconds, so the utilization rate of each channel is less than 50%.

Figure 2:
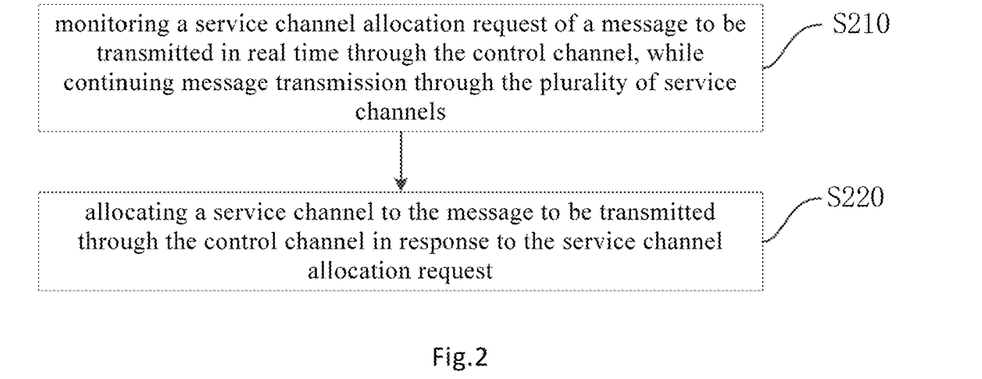
FIG. 2 shows a flow chart of a channel allocation method for a vehicle ad hoc network according to certain exemplary embodiments.

FIG. 2 shows a flow chart of a channel allocation method for a vehicle ad hoc network according to certain exemplary embodiments. The vehicle ad hoc network comprises a plurality of service channels and at least one control channel.

As shown in FIG. 2, the channel allocation method for the vehicle ad hoc network comprises:

S210: monitoring a service channel allocation request of a message to be transmitted in real time through the at least one control channel, while continuing message transmission through the plurality of service channels; and S210: allocating a service channel to the message to be transmitted through the at least one control channel in response to the service channel allocation request.

In the above channel allocation method for the vehicle ad hoc network, while the service channels work (i.e., transmit a message or data), the control channel monitors the service channel allocation request of the message to be transmitted in real time, which realizes the synchronization of the control channel and the service channels to avoid the problem that the control channel and the service channels wait for each other and cannot work synchronously in related technologies, thereby significantly improving the utilization rate of the control channel and the service channels.

In certain exemplary embodiments of the channel allocation method for the vehicle ad hoc network, the messages transmitted or the messages to be transmitted by the service channels may be classified into two broad categories, i.e., security messages and non-security messages. In the process of channel allocation by the control channel, the security message is prioritized over the non-security message for channel allocation. More specifically, in the vehicle ad hoc network, messages transmitted on the service channel can be classified into three levels according to importance: public security messages, instant messages, and Internet service messages in the order of importance from high to low, wherein the public security messages belong to security messages, and instant messages and Internet service messages belong to non-security messages. In general, public security messages may comprise emergency messages such as emergency traffic messages of fire engines, ambulances, and public security vehicles; traffic condition messages such as traffic accidents, road failures, and traffic jams, and so on. Instant messages comprises, for example, voice calls, video calls, and live broadcasts, etc. Internet service messages comprise, for example, news browsing, file transfer, and so on.

Figure 3:
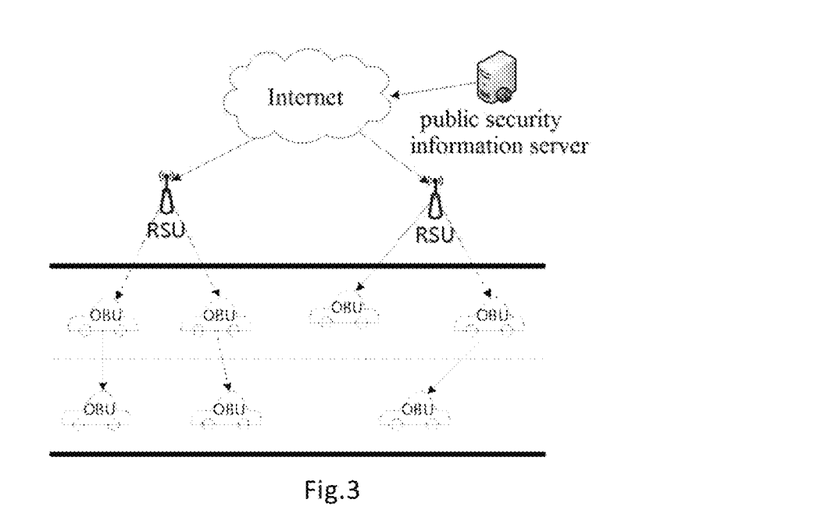
FIG. 3 shows a schematic diagram of a vehicle ad hoc network structure according to certain exemplary embodiments.

FIG. 3 shows a schematic diagram of a vehicle ad hoc network structure according to certain exemplary embodiments. As shown in FIG. 3, the vehicle ad hoc network comprises roadside units (RSUs) and onboard units (OBUs), and the vehicle ad hoc network is connected to the Internet via the roadside units and connected to the public security information server via the Internet. In the normal case, the public security message comes from a public security server, and the public security server connects to the VANET through an operator network (e.g., the Internet) and sends public security messages through the roadside unit to each of the onboard units in the VANET. Alternatively, the public security message may also come from the onboard unit OBU. For example, a vehicle discovers a traffic accident while driving, it may send a public security message to the roadside unit RSU to notify other vehicles in a communication area of the roadside unit to keep away from the accident section, or further the public security message is uploaded to the public security server through the roadside unit to notify more vehicles out of the communication area of the roadside unit to cope with the traffic condition in advance.

The purpose of classifying messages into different levels is to perform service channel allocation in different ways for different types of messages. Firstly, in all messages, security messages, especially public security messages, are the most important messages, since they involve security issues. Real-time transmittance must be guaranteed for security messages. All non-security messages must be compromised for security messages. Therefore, in certain exemplary embodiments of the channel allocation method for the vehicle ad hoc network, once the roadside unit finds that a security message needs to be sent, it immediately preempts all service channels that are not occupied by security messages, and non-security messages on the preempted service channel enter a queuing state, so that the security message can be sent in time and the vehicles receiving the security message can timely adjust the subsequent operation according to the security message. Secondly, regarding non-security messages, the reason why they are classified into instant messages and Internet service messages is that there is a certain difference in importance between them. The importance of instant messages is slightly higher than that of Internet service messages, so the impact of the two on channel allocation should also fully considered when allocating service channel for non-security messages. Therefore, in the method shown in FIG. 2, the service channel allocation request may comprise a type of the message to be transmitted (i.e., a security message or a non-security message, or more specifically a public security message, an instant message, and an Internet service message), and the step S220 of allocating a service channel to the message to be transmitted through the at least one control channel in response to the service channel allocation request may comprise: allocating a service channel to the message to be transmitted based on the type of message to be transmitted. The VANET channel allocation for security messages and non-security messages will be described in more detail below.

In the channel allocation method for the vehicle ad hoc network according to certain exemplary embodiments, the message to be transmitted may be a security message sent from a security center server, or may be a security message or a non-security message sent from an onboard unit. When the message to be transmitted is a non-security message and the service channel allocation request is sent by an onboard unit, the service channel allocation request comprises identity information of the onboard unit that sends the service channel allocation request and a type of the non-security message (e.g., instant messages or Internet service messages).

Since protocol versions of WAVE integrated on different onboard units may be inconsistent with a protocol version of WAVE integrated on a roadside unit, message transmission may fail. Therefore, in the foregoing process of message transmission, when a vehicle enters a communication range of a roadside unit and intends to access the network to experience an Internet service such as a voice call or a webpage access, the onboard unit first transmits the identity identification information and its protocol information to the roadside unit to be identified and verify whether the network protocol (mainly the protocol version of WAVE) is compatible. Therefore, in certain exemplary embodiments, the service channel allocation request may further comprise network protocol information of the onboard unit that sends the service channel allocation request, and the channel allocation method for the vehicle ad hoc network may further comprise: identifying the identity information of the onboard unit and verifying whether the network protocol information is compatible through the at least one control channel, prior to the allocating a service channel to the message to be transmitted through the at least one control channel in response to the service channel allocation request of the message to be transmitted.

Figure 4:
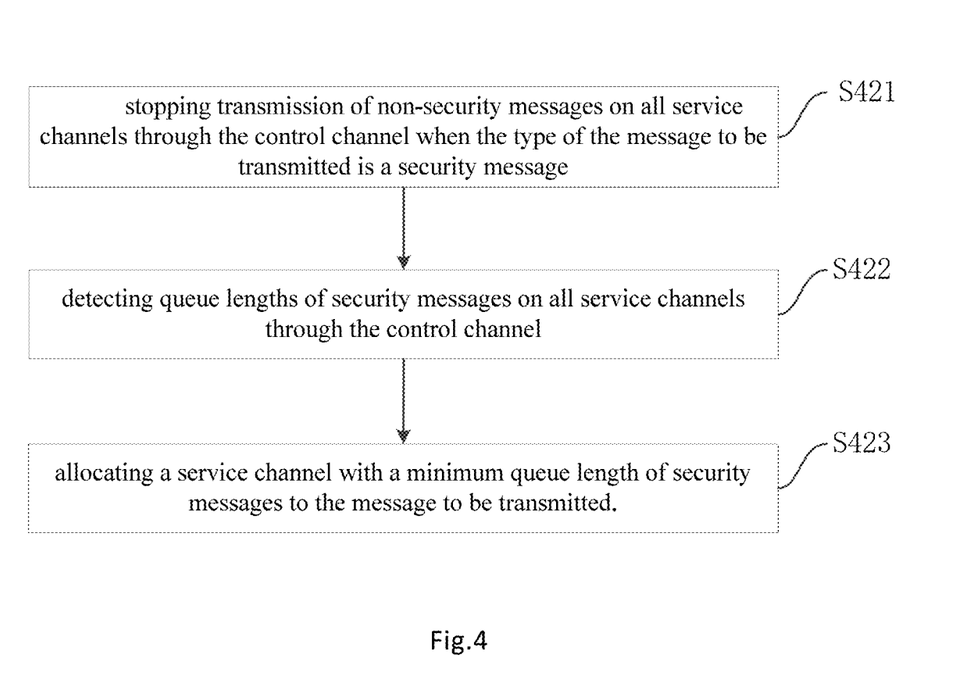
FIG. 4 shows a flow chart of a channel allocation method for a vehicle ad hoc network according to certain exemplary embodiments.

FIG. 4 shows a flow chart of a channel allocation method for a vehicle ad hoc network according to certain exemplary embodiments. As shown in FIG. 4, in certain exemplary embodiments of the channel allocation method for the vehicle ad hoc network, step S220 in FIG. 2 comprises:

S421, stopping transmission of non-security messages on all service channels through the at least one control channel when the type of the message to be transmitted is a security message;

S422, detecting queue lengths of security messages on all service channels through the at least one control channel; and S423, allocating a service channel with a minimum queue length of security messages to the message to be transmitted.

As described above, in order to enable the security message to be sent in time, the control channel preferentially allocates a service channel for the security message during the service channel allocation process. More specifically, in the process of service channel allocation for security information, when monitoring a service channel allocation request for a security message, the control channel suspends transmission of non-security message data on all service channels, while the security message being transmitted in the service channel is unaffected and the transmission continues to improve the utilization rate of the service channel; then, the control channel detects the queue lengths of security messages of all current service channels to determine the service channel with the minimum queue length of security messages and allocate it to the security message to be transmitted, such that the current security message to be transmitted can be transmitted in time without affecting the timely transmission of other security messages being transmitted and queued.

Optionally, security messages can be further classified according to the degree of urgency. For example, emergency messages related to life security can be regarded as the most important first level security messages, and other emergency messages having little relationship with life security can be regarded as relatively less important second level security messages, and so on. When there are many security messages and they are waiting in queues, more important security messages, according to the above-mentioned classification method, can occupy the service channel preferentially and be transmitted preferentially to avoid security accidents.

In certain exemplary embodiments of the channel allocation method for the vehicle ad hoc network, the step S423 of allocating the service channel with the minimum queue length of security messages to the security message requesting for service channel allocation comprises: allocating all idle service channels to the security message requesting the service channel when it is detected that there are idle service channels. In general, the minimum length of the security message queuing on the service channel being zero means there are no security messages on the service channel that are transmitting or waiting to be transmitted except for non-security messages. Therefore, according to the priority principle, the security message to be transmitted can directly preempt the service channel with zero queue length of the security message, so that the security message can be sent in time as fast as possible.

Figure 5:
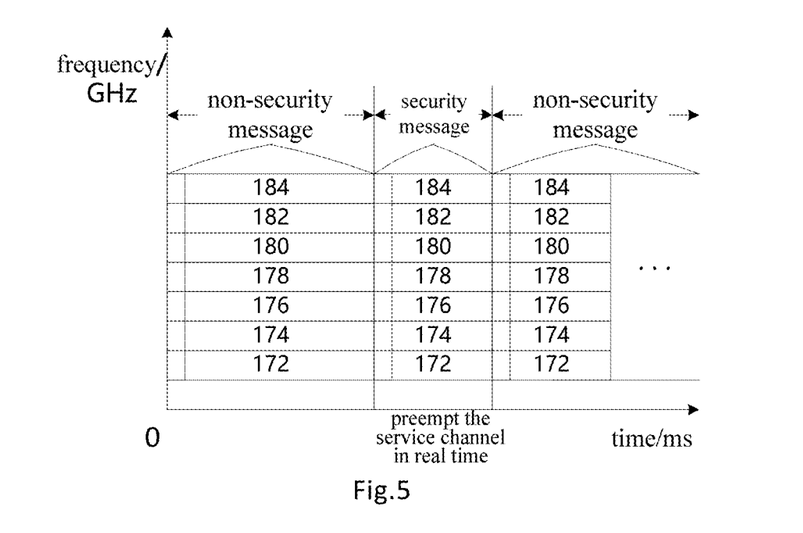
FIG. 5 shows a schematic diagram of channel utilization periods of a channel allocation method for a vehicle ad hoc network according to certain exemplary embodiments.

FIG. 5 shows a schematic diagram of channel utilization periods of a channel allocation method for a vehicle ad hoc network according to certain exemplary embodiments. As shown in FIG. 5, in the channel allocation method for the vehicle ad hoc network according to certain exemplary embodiments, if no security message arrives or requests for channel allocation, all the service channels keep working continuously, and the control channel monitors the channel allocation request of the message to be transmitted (comprising the security message and the non-security message) in real time and allocates a channel for it; when the security message arrives, the control channel allows the security message to preempt the service channel in real time. Specifically, once a public security message arrives at a roadside unit, the roadside unit immediately distributes a notification to each onboard unit that occupies channel through the control channel, and the onboard unit stops transmitting the non-security message occupying the service channel immediately after receiving the notification, and starts to receive the security message in full band.

As shown in FIG. 5, in order to realize fast distribution of security messages, there is a boot interval at the beginning of the security message phase, and in this boot interval all onboard units synchronously stop service channel occupation and prepare for security message reception. There is also a boot interval at the beginning of the non-security message phase, mainly at the transition between the security message phase and the non-security message phase, and in this boot interval the control channel re-notifies the onboard units in the channel occupation list before the security message phase to continue transmission of non-security messages. The above two boot intervals can adopt the same amount of time as the related art IEEE 802.11p/WAVE protocol stack.

Compared with the related art shown in FIG. 2, the channel utilization period diagram in the channel allocation method for the vehicle ad hoc network according to certain exemplary embodiments shown in FIG. 5 can almost realize full-time utilization of the service channels, thereby greatly improving channel utilization rate.

Figure 6:
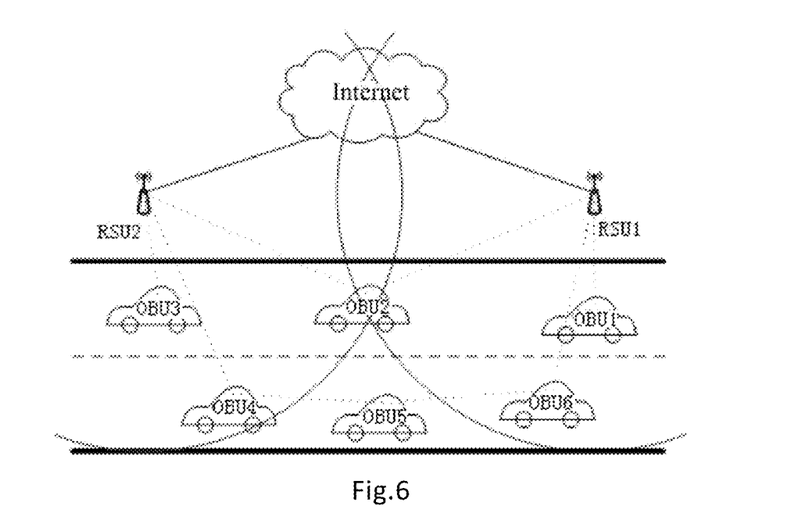
FIG. 6 shows a schematic diagram of a vehicle ad hoc network structure according to certain exemplary embodiments.

FIG. 6 shows a schematic diagram of a vehicle ad hoc network structure according to certain exemplary embodiments. As shown in FIG. 6, the roadside units comprise at least a first roadside unit RSU1 and a second roadside unit RSU2 adjacent thereto, and the onboard units OBU1-OBU6 moves forward with the vehicles. The onboard units OBU1, 2, 6 are in the communication range of the first roadside unit RSU1, the onboard units OBU2, 3, 4 are in the communication range of the second roadside unit RSU2, and the onboard unit OBU5 is neither in the communication range of the first roadside unit RSU1 nor in the communication range of the second roadside unit RSU2, i.e. the onboard unit OBU5 is in a communication black hole.

Figure 7:
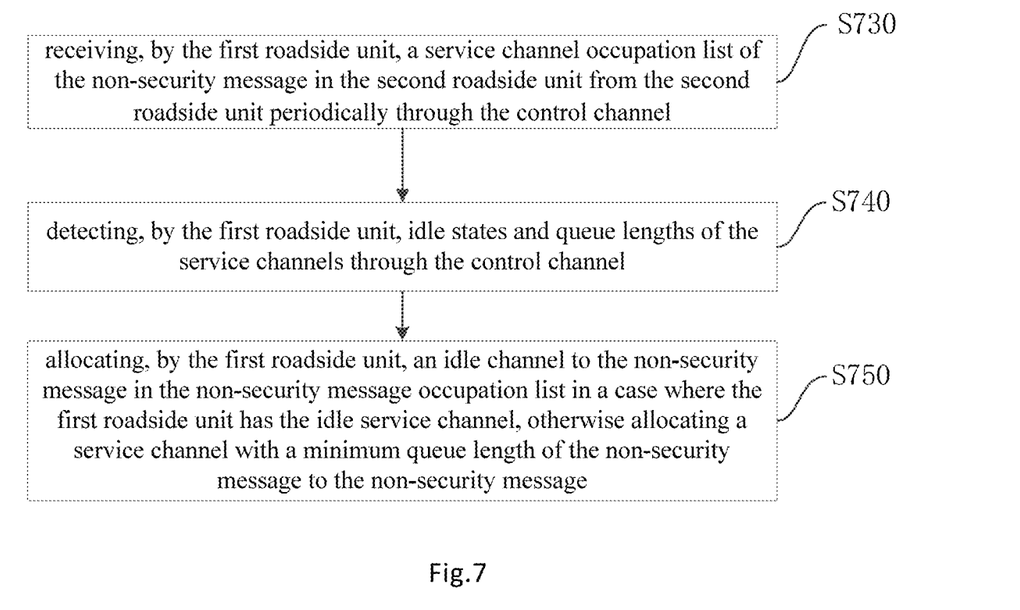
FIG. 7 shows a flow chart of a channel allocation method for a vehicle ad hoc network according to certain exemplary embodiments.

FIG. 7 shows a channel allocation method for a vehicle ad hoc network according to certain exemplary embodiments, wherein the roadside units comprise a first roadside unit and a second roadside unit adjacent thereto, the method further comprises:

S730, receiving, by the first roadside unit, a service channel occupation list of the non-security message in the second roadside unit from the second roadside unit periodically through the at least one control channel;

S740, detecting, by the first roadside unit, idle states and queue lengths of the plurality of service channels through the at least one control channel;

S750, allocating, by the first roadside unit, an idle channel to the non-security message in the non-security message occupation list of the second roadside unit through the at least one control channel, in a case where the first roadside unit has the idle service channel, otherwise allocating a service channel with a minimum queue length of the non-security message in the first roadside unit to the non-security message in the non-security message occupation list of the second roadside unit.

Figure 8:
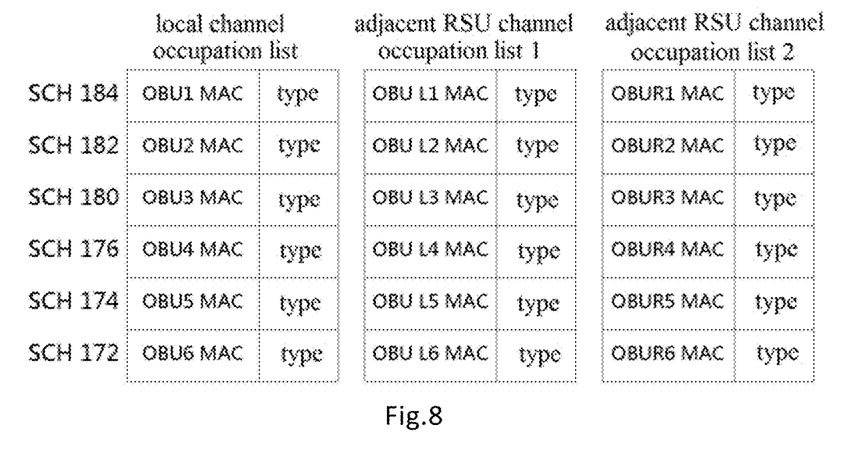
FIG. 8 shows a schematic diagram of a local channel occupation list on a roadside unit and channel occupation lists of its adjacent roadside units in a channel allocation method for a vehicle ad hoc network according to certain exemplary embodiments.

FIG. 8 shows a schematic diagram of a local channel occupation list on a roadside unit and channel occupation lists of its adjacent roadside units in a channel allocation method for a vehicle ad hoc network according to certain exemplary embodiments. The local channel occupation list is periodically broadcast to the adjacent roadside units RSUs with the HELLO message, and the channel occupation lists of the two adjacent roadside units RSUs are used to reserve the channel in advance for the onboard unit OBUoccupying the channel. Each list stores two mandatory items, the MAC address of the onboard unit OBU occupying the channel and the data type of the transmission. The MAC address is used to identify the onboard unit OBU. The data type mainly records which level the message belongs to and is used in the subsequent channel allocation scheme.

In order to achieve seamless retransmission and ensure service experience when the onboard unit transitions from the communication range of the first roadside unit RSU1 to the communication range of the adjacent second roadside unit RSU2, the second roadside unit RSU2 may reserve a service channel in advance for the onboard unit that is transmitting messages (i.e. occupying the channel) in the communication area of the adjacent first road side unit RSU1, so that the message that the onboard unit is transmitting continues to be transmitted immediately thorough the reserved service channel when the onboard unit arrives at the second road side unit RSU2 with the vehicle. In this way, fast and seamless retransmission is achieved, and the problem of transmission interruption caused by transition of the communication area is avoided. In order to achieve seamless retransmission, the HELLO packet can be used to realize the one-hop sharing of the channel occupation list, that is, each roadside unit can periodically send its channel occupation list to its adjacent one-hop roadside unit through the HELLO packet, so that each roadside unit can know the channel occupation condition of its adjacent roadside unit or the message being transmitted and the onboard unit occupying the channel. Generally, each roadside unit can maintain two or three channel occupation lists: a channel occupation list of itself, and channel occupation lists of one or two adjacent roadside units. Generally, since roads are all in the form of lines, the roadside units are also continuously deployed along the road. Thus, one roadside unit generally has only two adjacent roadside units, and each roadside unit needs to store channel occupation lists of two adjacent side units on the left and right. However, on a wide road such as a highway, roadside units can be respectively installed on the two sides of the road to communicate with vehicles traveling in different directions. In this case, each roadside unit only needs to store a channel occupation list of an adjacent roadside unit in the direction opposite to the vehicle travelling direction.

In certain exemplary embodiments, the channel occupation list may comprise identity information of the onboard unit occupying the channel and the type of message being transmitted on the channel. The type of message may comprise a security message and a non-security message. Further, the security message may comprise a public security message, and the non-security message comprises an instant message and an Internet service message in the order of importance from high to low. In this way, any roadside unit can know the onboard unit and the message type for which the service channel is to be reserved through the channel occupation list of its adjacent roadside unit, so that channel allocation for the onboard unit and its messages can be performed based on the message type (whether it is a security message) according to different schemes. As described above, since the security message can be transmitted by preempting all channels in real-time, there is no channel reservation problem for the security message of the adjacent second roadside unit. Thus, the channel occupation list of the second roadside unit can be simplified to a channel occupation list of non-security messages, and it can comprise the type of non-security message and the identity information of the onboard unit occupying the channel.

More specifically, the channel seamless retransmission scheme is as follows: as shown in FIG. 6, when OBU2 occupies the channel of RSU1, if it detects the signal of RSU2 and thus starts entering the communication range of RSU2, OBU2 immediately requests for a service channel to RSU2 through CCH. Then, if RSU2 has reserved a service channel for it (that is, the service channel is allocated in advance), OBU2 immediately transfers the data transmission to RSU2 and notifies RSU1 to release the occupied channel; if RSU2 does not reserve a service channel and has no idle service channel, OBU2 will continue to occupy the service channel of RSU1 and perform channel queuing in RSU2 until the signal of RSU1 disappears and the transmission is interrupted.

Alternatively, when the vehicle communication range is switched, the vehicle may enter a communication black hole. As shown in FIG. 4, OBU5 is neither in the communication range of RSU1 nor in the communication range of RSU2, that is, OBU5 can't be connected to RSU1 or RSU2. In this case, according to the self-organizing characteristics of all onboard units in the vehicle ad hoc network, OBU5 can use OBU4 or OBU6 in the vicinity as a relay to indirectly connect RSU1 or RSU2, thereby overcoming the communication black hole problem. Thus, according to an aspect of the present disclosure, a communication method for a vehicle ad hoc network is provided, comprising: when an onboard unit is out of a communication range of a first roadside unit and has not entered a communication range of a second roadside unit adjacent to the first roadside unit, connecting the onboard unit indirectly to the first roadside unit or the second roadside unit via a first onboard unit in the communication range of the first roadside unit or a second onboard unit in the communication range of the second roadside unit.

Figure 9:
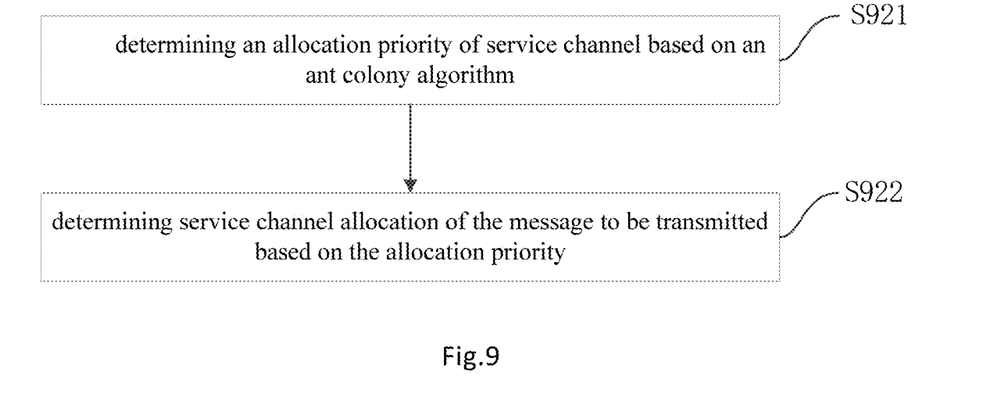
FIG. 9 shows a flow chart of a channel allocation method for a vehicle ad hoc network according to certain exemplary embodiments.

FIG. 9 shows a flow chart of a channel allocation method for a vehicle ad hoc network according to certain exemplary embodiments. Step S220 shown in FIG. 2 may comprise:

S921, determining an allocation priority of each service channel based on an ant colony algorithm;

S922, determining a service channel allocation of the message to be transmitted based on the allocation priority of each service channel.

In certain exemplary embodiments, the service channel allocation scheme for messages (comprising security messages and non-security messages) shown in FIG. 2 may be based on, for example, an ant colony algorithm. The principle of the ant colony algorithm is as follows. Ants leave pheromones along the way when they search for food. The number of ants passing through the shortest optimal path per unit time is more than that of other paths and thus the pheromone concentration on the shortest optimal path becomes the largest over time, so the optimal path from the nest to the food source can be obtained based on the pheromone concentration.

Since the message to be transmitted is mainly from the onboard unit on the vehicle and the onboard unit accesses the Internet through the adjacent roadside unit to realize the transmission of the message, the onboard unit on each vehicle can be regarded as a search ant, the roadside unit channel can be regarded as a path to the food source, and the pheromone concentration can be defined as the allocation priority of each service channel, so the optimal channel allocation can be obtained by calculating the allocation priority (i.e., pheromone concentration) of each channel.

Next, the service channel allocation scheme based on ant colony algorithm is introduced in detail. It is assumed that the vehicle ad hoc network comprises at least a first roadside unit and a second roadside unit adjacent thereto, and there are n service channels in the communication area of the first roadside unit, n>=2, based on the ant colony algorithm the allocation priority (or pheromone concentration) of each of the n service channels in the first roadside unit is determined by the following formula:

$$\sigma_i = \frac{C_i}{\rho S_i + (1-\rho)(R_i + R_i' + \alpha I_i + \alpha' I_i') + 1}, \quad i = 1, 2, \ldots, n \quad (1)$$

where $\sigma_i$ represents the allocation priority of the service channel i, $S_i$ represents the queue length of security messages on the service channel i, $R_i$ represents the queue length of instant messages in the communication area of the first roadside unit on the service channel i, $I_i$ represents the queue length of Internet service messages in the communication area of the first roadside unit on the service channel i, $R_i'$ and $I_i'$ represents the queue length of instant messages and Internet service messages in the service channel occupation list in the second roadside unit communication area on the service channel i, respectively, $C_i$ represents a physical bandwidth of the service channel i;

$\alpha$ and $\alpha'$ are constants, $0<\alpha<1$, $0<\alpha'<1$, and $\alpha$ and $\alpha'$ represents predetermined influence factors of Internet service messages in the first roadside unit communication area and Internet service messages in the service channel occupation list in the second roadside unit communication area queued on the service channel i on the allocation priority of the service channel i, respectively, $\rho$ is a constant 0 or 1, representing whether the message to be transmitted is a security message, wherein when $\rho=1$, it represents a security message, when $\rho=0$, it represents a non-security message.

The parameters in formula (1) can be determined based in the following manner:

(i) $S_i$, $R_i$, $I_i$, $R_i'$ and $I_i'$ can be determined by detecting through the control channel;

$C_i$, $\rho$, $\alpha$ and $\alpha'$ are predetermined constants.

$C_i$ is the physical bandwidth of the current channel i and is therefore a fixed constant greater than zero.

$\alpha$ and $\alpha'$ represents the influence factors of the local Internet service message being queued on the current channel and the Internet service message being transmitted in the communication area of the adjacent second roadside unit on the allocation priority of the current channel, respectively. According to the above, non-security messages are classified into instant messages and Internet service messages according to importance from high to low, so the influence of the two on the channel allocation priority is different, and further the influence factor or influence degree of the instant message should be greater than that of the Internet service message. Thus, in formula (1), the influence factors of the instant message on the current channel and the instant message being transmitted on the adjacent second roadside unit on the allocation priority of the current channel are actually set to be 1, that is, the two type of messages have the same degree of influence, and the influence factors α and α' of the local Internet service message being queued on the current channel and the Internet service message being transmitted in the communication area of the adjacent second-side unit on the allocation priority of the current channel are smaller than 1. Generally, α<α', in order to satisfy the purpose of "seamless retransmission" as much as possible, the priority of the Internet service message being transmitted in the communication area of the second roadside unit can be set to be relatively higher than that of the local Internet service message waiting on the current channel of the first roadside unit, so the influence of the Internet service message being transmitted in the communication area of the second roadside unit on the allocation priority of the current channel is greater.

ρ is a constant 0 or 1, representing whether the message to be transmitted is a security message, for example:

when the message to be transmitted is a security message, the formula (1) is simplified as $$\sigma_i = \frac{C_i}{S_i + 1}$$

In this case, the security message to be transmitted can be transmitted immediately by jumping the queue to the channel with no transmission and queuing of the security message, without considering the transmission and queuing of the non-security message. If all channels are occupied by security messages, the security message to be transmitted is queued behind these security messages.

When the message to be transmitted is a non-security message, formula (1) is simplified as $$\sigma_i = \frac{C_i}{R_i + R'_i + \alpha I_i + \alpha' I'_i + 1}$$

It can be seen that the allocation priority is related to the local instant message, the Internet service message queuing on the current channel i and the instant message and the Internet service message being transmitted by the adjacent second roadside unit, and the influence degree of instant message and Internet service message is different, see above.

In certain exemplary embodiments, an allocation probability of the service channel may also be defined according to the allocation priority of the service channel. For example, whether it is a security message or a non-security message, the allocation probability of each service channel can be defined as:

$$P_i = \frac{\sigma_i^k}{\sum_i (\sigma_i^k)}, \quad i = 1, 2, \ldots, n \quad (2)$$

where $P_i$ represents an allocation probability of the service channel i, $\sigma_i$ represents an allocation priority of the service channel i, and k represents a predetermined adjustment parameter for adjusting the degree of change of the allocation probability.

Similar to the allocation priority, the optimal allocation of the channel can also be determined based on the allocation probability, that is, the channel to be allocated is determined based on the allocation probability. For example, the service channel with the highest allocation probability may be allocated to the message to be transmitted, because according to the principle of the ant colony algorithm, the service channel with the highest allocation probability (i.e., the highest allocation priority) is actually the path with the largest pheromone concentration in the ant colony algorithm, i.e., the optimal path from the ant nest to the food source.

According to formula (2), the higher the allocation priority on each channel, the higher the allocation probability, and the two are equivalent. Additionally, according to formulas (1) and (2), the higher the importance of the message type and the longer the queue on a channel is, the lower the probability that the channel is selected. Conversely, the lower the importance of the message type and the shorter the queue on a channel is, the higher the probability that the channel is selected. In particular, when a certain channel j (j=1, . . . , n) is idle, the allocation priority of this channel $\sigma_j=C_j$, so its allocation priority is higher than other service channels occupied by messages, and the probability of being allocated will be very large.

According to formula (1) or (2), with the allocation priority or allocation probability for selecting a service channel for transmitting a message to be transmitted, the channel service request of each onboard unit is randomized to balance the channel load, thereby making the channel utilization more equitable and efficient.

In the channel allocation method for the vehicle ad hoc network according to certain exemplary embodiments, after completing the service channel allocation, the channel allocation method further comprises: when the message to be transmitted is a non-security message, determining, by the first roadside unit, a queue time of the message to be transmitted through the at least one control channel based on queue length of messages on the allocated service channel; and transmitting, by the first roadside unit, the queue time to the onboard unit that sends the allocation channel request through the control channel to implement on-time transmission of the message to be transmitted. Specifically, after the service channel is allocated, the roadside unit may calculate the queue time based on the queue length of the service channel to inform the onboard unit. The onboard unit may set a service channel occupation timer based on the queue time, and transmit the message to be transmitted through the allocated service channel immediately after the channel occupation time is over, thereby realizing timely transmission of the message to be transmitted to avoid waste of channel resources due to delayed transmission.

According to an exemplary embodiment, computer readable storage medium or media are provided, storing computer program instructions thereon which, when executed, perform the channel allocation method for the vehicle ad hoc network according to certain exemplary embodiments.

In the description of the present specification, the descriptions of the terms "one embodiment", "certain exemplary embodiments", "example", "specific examples", or "some examples" and the like are intended to mean the specific features, structures, materials or characteristics described in connection with the embodiments or examples are comprised in at least one embodiment or example of the present disclosure. In the present specification, the schematic representation of the above terms is not necessarily directed to the same embodiment or example. Furthermore, the specific features, structures, materials, or characteristics described may be combined in a suitable manner in any one or more embodiments or examples. In addition, various embodiments or examples described in the specification, as well as features of various embodiments or examples, may be combined without conflicting.

Moreover, the terms "first" and "second" are used for descriptive purposes only and are not to be construed as indicating or implying a relative importance or implicitly indicating the number of technical features. Thus, features defining with "first" or "second" may comprise at least one of the features, either explicitly or implicitly. In the description of the present disclosure, the meaning of "a plurality" is at least two, such as two, three, etc., unless specifically defined otherwise.

Any process or method description in the flowcharts or otherwise described herein can be understood to represent a module, segment or portion of code comprising one or more executable instructions for implementing the steps of a custom logic function or process. And the scope of the optional embodiments of the present disclosure comprises additional implementations in which the functions may be performed in an order not shown or discussed, e.g., in a substantially simultaneous manner or in the reverse order, depending on the function involved, which will be understood by those skilled in the art.

The logic and/or steps represented in the flowchart or otherwise described herein, for example, may be considered as an ordered list of executable instructions for implementing logical functions, and may be embodied in any computer readable medium to be used by, or in conjunction with, an instruction execution system, apparatus, or device (e.g., a computer-based system, a system comprising a processor, or other system that can fetch and execute instructions from, an instruction execution system, apparatus, or device). In this specification, a "computer-readable medium" can be any apparatus that can contain, store, communicate, propagate, or transport a program for use in an instruction execution system, apparatus, or device, or in conjunction with such an instruction execution system, apparatus, or device. More specific examples of the computer readable medium may comprise, for example, the following: an electrical connection (electronic device) having one or more wires, a portable computer disk (magnetic device), a random-access memory, read only memory, erasable programmable read only memory or flash memory, optical fiber devices, and compact disc read only memory. In addition, the computer readable medium may even be a paper or other suitable medium on which the program can be printed, as the paper or other medium may be optically scanned, followed by editing, interpretation or, if appropriate, other suitable manner to obtain the program electronically and then store it in computer memory.

It should be understood that various parts of the present disclosure can be implemented in hardware, software, firmware, or a combination thereof. In the above-described embodiments, multiple steps or methods may be implemented in software or firmware stored in a memory and executed by a suitable instruction execution system. For example, if implemented in hardware, it can be implemented by any one or combination of the following techniques well known in the art: discrete logic circuits with logic gates for implementing logic functions on data signals, ASIC with appropriate combinational logic gates, programmable gate array, field programmable gate array, and the like.

One of ordinary skill in the art will appreciate that all or part of the steps of the above-described embodiments may be performed by hardware associated with program instructions, which may be stored in a computer readable storage medium, comprising, when executed, one or a combination of the steps of the method embodiments.

In addition, each functional unit in various embodiments of the present disclosure may be integrated into one processing module, or each unit may exist physically separately, or two or more units may be integrated into one module. The above integrated modules can be implemented in the form of hardware or in the form of software functional modules. The integrated modules, if implemented in the form of software functional modules and sold or used as separate products, may also be stored in a computer readable storage medium.

The above is only a part of the embodiments of the present disclosure, and it should be noted that those skilled in the art can also make some improvements and refinements without departing from the principles of the present disclosure, which should also be considered as the scope of protection of the present disclosure.

It will be understand by those skilled in the art that the singular forms "a", "one", and "the" may also comprise plural phase, unless specifically stated. It is to be understood that the phrase "comprise" means the features, integers, steps, operations, elements or components are presented, but not exclude the presentation or addition of one or more other features, integers, steps, operations, elements, components or group thereof. It will be understood that when an element is referred to as being "connected" or "coupled" to another element, it can be directly connected or coupled to the other element, or an intermediate element can be present. Further, "connected" or "coupled" as used herein may comprise either a wireless connection or a wireless coupling. The term "and/or" used herein comprises all or any of the elements and all combinations of one or more of the associated terms.

Those skilled in the art will understand that all terms (comprising technical and scientific terms) used herein have the same meaning as commonly understood by one of ordinary skill in the art. It should also be understood that terms such as those defined in a general dictionary should be understood to have meaning consistent with the meaning in the context of the prior art, and will not be explained ideally or excessively formally unless specifically defined as herein.

The invention claimed is:

1. A channel allocation method for a vehicle ad hoc network comprising a plurality of service channels and at least one control channel, comprising:
   monitoring a service channel allocation request of a message to be transmitted in real time through the at least one control channel, while continuing message transmission through the plurality of service channels, wherein the service channel allocation request comprises a type of the message to be transmitted, the type of the message to be transmitted being used to indicating whether the message is a security message or a non-security message; and
   allocating a service channel to the message to be transmitted through the at least one control channel based on the type of the message to be transmitted,
   wherein the allocating a service channel to the message to be transmitted through the at least one control channel based on the type of the message to be transmitted comprises:

stopping transmission of non-security messages on all service channels through the at least one control channel, when the type of the message to be transmitted indicates the message is a security message;

detecting queue lengths of security messages on all service channels through the at least one control channel; and allocating a service channel with a minimum queue length of security messages to the message to be transmitted.

2. The channel allocation method for the vehicle ad hoc network according to claim 1, wherein the vehicle ad hoc network is connected to a public security information server via the Internet, and the security message comprises a public security message from the public security information server.

3. The channel allocation method for the vehicle ad hoc network according to claim 1, wherein the allocating a service channel with the minimum queue length of security messages to the message to be transmitted comprises: allocating all idle service channels to the security message requesting the service channel, when it is detected that there are idle service channels.

4. The channel allocation method for the vehicle ad hoc network according to claim 1, wherein the non-security message comprises an instant message and an Internet service message.

5. The channel allocation method for the vehicle ad hoc network according to claim 4, wherein the vehicle ad hoc network comprises onboard communication equipment and roadside communication equipment, and when the message to be transmitted is a non-security message and the service channel allocation request is sent by an onboard communication equipment, the service channel allocation request comprises identity information of the board communication equipment that sends the service channel allocation request and a type of the non-security message.

6. The channel allocation method for the vehicle ad hoc network according to claim 5, wherein when the message to be transmitted is a non-security message and the service channel allocation request is sent by the onboard communication equipment, the service channel allocation request further comprises network protocol information of the onboard communication equipment that sends the service channel allocation request, and the method further comprises: identifying the identity information of the onboard communication equipment and verifying whether the network protocol information is compatible through the at least one control channel, prior to the allocating a service channel to the message to be transmitted through the at least one control channel based on the type of the message to be transmitted.

7. The channel allocation method for the vehicle ad hoc network according to claim 5, wherein the roadside communication equipment comprise a first roadside communication equipment and a second roadside communication equipment adjacent thereto, and the method further comprises:

receiving, by the first roadside communication equipment, a service channel occupation list of the non-security message in the second roadside communication equipment from the second roadside communication equipment periodically through the at least one control channel, detecting, by the first roadside communication equipment, idle states and queue lengths of the plurality of service channels through the at least one control channel, and allocating, by the first roadside communication equipment, an idle service channel to the non-security message in the non-security message occupation list of the second roadside communication equipment through the at least one control channel, in a case where the first roadside communication equipment has the idle service channel, otherwise allocating a service channel with a minimum queue length of the non-security message in the first roadside communication equipment to the non-security message in the non-security message occupation list of the second roadside communication equipment.

8. The channel allocation method for the vehicle ad hoc network according to claim 7, wherein the non-security message channel occupation list in the second roadside communication equipment comprises the identity information of the onboard communication equipment occupying the service channel and the type of the non-security message.

9. The channel allocation method for the vehicle ad hoc network according to claim 8, wherein in a communication area of the first roadside communication equipment, the plurality of service channels comprise n channels, n>=2, and the allocating the service channel to the message to be transmitted based on the type of the message to be transmitted comprises:

detecting, in each of the n service channels, a queue length of security messages, a queue length of instant messages and a queue length of Internet messages in the first roadside communication equipment communication area, and a queue length of instant messages and a queue length of Internet messages in the service channel occupation list in the second roadside communication equipment communication area;

determining an allocation priority of each of then service channels by:

$$\sigma_i = \frac{C_i}{\rho S_i + (1-\rho)(R_i + R_i' + \alpha I_i + \alpha' I_i') + 1}, \quad i = 1, 2, \ldots, n$$

where $\sigma_i$ represents the allocation priority of the service channel i, $S_i$ represents the queue length of security messages on the service channel i, $R_i$ represents the queue length of instant messages in the communication area of the first roadside communication equipment on the service channel i, $I_i$ represents the queue length of Internet service messages in the communication area of the first roadside communication equipment on the service channel i, $R_i'$ and $I_i'$ represents the queue length of instant messages and Internet service messages in the service channel occupation list in the second roadside communication equipment communication area on the service channel i, respectively, $C_i$ represents the physical bandwidth of the service channel i;

$\alpha$ and $\alpha'$ are constants, $0<\alpha<1$, $0<\alpha'<1$, and $\alpha$ and $\alpha'$ represents predetermined influence factors of Internet service messages in the first roadside communication equipment communication area and Internet service messages in the service channel occupation list in the second roadside communication equipment communication area queued on the service channel i on the allocation priority of the service channel i, respectively, ρ is a constant representing whether the message to be transmitted is a security message, wherein when ρ=1, it represents a security message, when ρ=0, it represents a non-security message; and allocating a service channel to the message to be transmitted based on the allocation priority of the n service channels.

10. The channel allocation method for the vehicle ad hoc network according to claim 9, wherein the allocating a service channel to the message to be transmitted based on the allocation priority of the n service channels comprises:

calculating an allocation probability of each service channel based on the allocation priority by $$P_i = \frac{\sigma_i^k}{\sum_i (\sigma_i^k)}, \quad i = 1, 2, \ldots, n$$

where $P_i$ represents an allocation probability of the service channel i, and k represents a predetermined adjustment parameter for adjusting the degree of change of the allocation probability; and allocating a service channel to the message to be transmitted based on allocation probabilities of the n service channels.

11. The channel allocation method for the vehicle ad hoc network according to claim 9, further comprising:

when the message to be transmitted is a non-security message, determining, by the first roadside communication equipment, a queue time of the message to be transmitted through the at least one control channel based on queue length of messages on the allocated service channel; and transmitting, by the first roadside communication equipment, the queue time to the onboard communication equipment that sends the allocation channel request through the control channel to implement on-time transmission of the message to be transmitted.

12. The channel allocation method for the vehicle ad hoc network according to claim 5, wherein the identity information of the onboard communication equipment may comprises a MAC address or a IP address of the onboard communication equipment.

13. Computer readable storage medium or media, storing computer program instructions thereon which, when executed, perform the channel allocation method for the vehicle ad hoc network according to claim 1.

\* \* \* \* \*